US008185508B2

(12) United States Patent
Vemuri et al.

(10) Patent No.: US 8,185,508 B2
(45) Date of Patent: May 22, 2012

(54) ADAPTIVE FILTER INDEX FOR DETERMINING QUERIES AFFECTED BY A DML OPERATION

(75) Inventors: Srinivas S. Vemuri, Santa Clara, CA (US); Atrayee Mullick, Santa Clara, CA (US); Bipul Sinha, Foster City, CA (US); Amit Ganesh, San Jose, CA (US); Dieter Gawlick, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 726 days.

(21) Appl. No.: 12/326,822

(22) Filed: Dec. 2, 2008

(65) Prior Publication Data

US 2010/0036803 A1 Feb. 11, 2010

Related U.S. Application Data

(63) Continuation-in-part of application No. 12/189,078, filed on Aug. 8, 2008, now Pat. No. 8,037,040.

(60) Provisional application No. 61/087,607, filed on Aug. 8, 2008.

(51) Int. Cl.
*G06F 17/30* (2006.01)
(52) U.S. Cl. ..................................... 707/702
(58) Field of Classification Search .......... 707/688–690, 707/694–696, 700, 702, 713, 736, 739, 758, 707/760, 769, 773
See application file for complete search history.

(56) References Cited

U.S. PATENT DOCUMENTS

| 5,768,532 | A | 6/1998 | Megerian |
| 5,999,946 | A * | 12/1999 | Bailis et al. ........................ 1/1 |
| 6,405,191 | B1 | 6/2002 | Bhatt et al. |
| 2002/0128897 | A1 | 9/2002 | Nelson et al. |
| 2003/0144980 | A1 | 7/2003 | Holmgren |
| 2004/0205048 | A1 * | 10/2004 | Pizzo et al. ........................ 707/3 |
| 2005/0039049 | A1 | 2/2005 | Chang et al. |
| 2005/0055381 | A1 * | 3/2005 | Ganesh et al. ................. 707/200 |
| 2005/0055384 | A1 | 3/2005 | Ganesh et al. |
| 2005/0091287 | A1 | 4/2005 | Sedlar |
| 2006/0206532 | A1 | 9/2006 | MacLaurin |
| 2008/0098173 | A1 * | 4/2008 | Chidambaran et al. ........ 711/118 |
| 2008/0215528 | A1 | 9/2008 | Sedlar |
| 2010/0036831 | A1 | 2/2010 | Vemuri et al. |

OTHER PUBLICATIONS

N. Gehani et al., "OdeFs: A File System Interface to an Object-Oriented Database", AT&T Bell Laboratories, New Jersey, 1989.
U.S. Appl. No. 12/189,078, filed Aug. 8, 2008, Final Office Action, Mailing Date Mar. 14, 2011.

* cited by examiner

*Primary Examiner* — Cam-Linh Nguyen
(74) *Attorney, Agent, or Firm* — Hickman Palermo Truong Becker Bingham Wong LLP

(57) ABSTRACT

Techniques are disclosed for creating and using a filter index in order to identify registered queries whose result sets are likely to have been changed by changes made to tables. The filter index entries are based on filter conditions. The filter conditions are created based on predicates contained in the registered queries. The filter conditions may include exclusive predicates and join predicates. Join predicates that join a table T1 with a table T2 may be instantiated by replacing references to table T2 with values extracted from table T2. Various techniques are described for recognizing situations in which a query can be included in, or excluded from, the set of likely-changed queries, without fully evaluating the filter conditions that correspond to the queries.

32 Claims, 6 Drawing Sheets

ADAPTIVE FILTER INDEX FOR DETERMINING QUERIES AFFECTED BY A DML OPERATION

PRIORITY CLAIM

The present application is related to and claims priority as a continuation-in-part of U.S. patent application Ser. No. 12/189,078, entitled "GENERATING CONTINUOUS QUERY NOTIFICATIONS", filed on Aug. 8, 2008 now U.S. Pat. No. 8,037,040. The present application also claims priority to Provisional Patent Application No. 61/087,607, entitled "ADAPTIVE FILTER INDEX FOR DETERMINING QUERIES AFFECTED BY A DML OPERATION", filed Aug. 8, 2008. The entire contents of both of which are incorporated herein by this reference.

FIELD OF THE INVENTION

The present invention relates to determining queries affected by DML operations and, more specifically, to an adaptive filter index used to determine which queries are affected by DML operations.

BACKGROUND

To determine how changes made to a database have affected the results returned by a particular query, the particular query may be resubmitted, and the results produced by a previous execution of the query can be compared with the results produced by the current execution of the query. Unfortunately, the process of re-submitting a query and then comparing previous and current results may be tedious and time consuming, especially when many queries are involved. Further, in many circumstances, users would like to know about query result changes continuously, AS and WHEN the query result changes occur.

A variety of techniques may be used to inform users of query result changes. For example, according to a "trigger" approach, a trigger is created on each of the tables referenced in the queries of interest. One implementation of the trigger approach is described in U.S. Pat. No. 6,405,191, entitled "Publish and Subscribe in a Database System". Inside the body of the trigger, the query is evaluated to detect if the result set has changed. For the trigger approach to be feasible, the trigger has to know the rows changed and the contents of the changed rows (before and after images). Because the after image is desired, the trigger approach will typically be implemented using triggers that fire after the change has been applied (an "after DML" trigger). However, a COMMIT trigger may also be used in conjunction with DML triggers. Specifically, DML triggers may be used to capture and buffer the row changes, and the COMMIT trigger may be used to send the buffered changes to the interested users.

Unfortunately, the trigger approach has several problems. For example, separate triggers have to be defined for each table that is being monitored for changes. Thus, one thousand triggers would be required to monitor one thousand tables. In addition, the trigger body execution has a significant cost, since it is akin to executing a PL/SQL procedure. In the presence of a large number of queries, evaluating all the queries can be prohibitively expensive. This can significantly hamper the throughput (and increase latency) of OLTP transactions.

There are also visibility issues with DML triggers since the DML triggers are invoked while the transaction is still active. Invoking the DML trigger while the transaction is still alive may cause correctness issues, since the state of the database when the transaction is active may be significantly different compared to the state of the database at the time the transaction commits, thereby leading to incorrect evaluations. For the evaluation to be correct, the changes performed within a transaction have to be considered atomic as of the COMMIT POINT of the transaction. While visibility issues may be partly addressed by the use of COMMIT triggers, the problems of performance and scalability would still remain.

According to a log mining approach, logs may be used as a source of changes. The changes identified from the logs may be used to evaluate query result changes. The log mining approach can be implemented on top of a commercial DBMS using the log mining tools available. However, there is still a great cost to the log mining approach, both in terms of performance/scalability as well as complexity of logic.

Specifically, log mining has significant I/O costs, since log mining involves scanning redo logs to obtain log records. Every transaction has to be scanned, causing a great deal of I/O. Further, evaluating query result changes is also non-trivial, and evaluating every query will have severe scalability issues.

In a common usage scenario, the events of interest (i.e the query result changes) occur at a frequency much lower than the frequency of OLTP transaction commits i.e a large majority of transactions may not affect any query results at all. Moreover, even if a transaction is "interesting", the transaction may affect only one or a few of possibly many thousands of registered queries. Checking query result changes for all possible queries for all possible transactions across all DML changes is not likely be a scalable solution.

One technique for identifying query result changes that avoids the scalability and performance issues of the trigger and log mining approaches is described in U.S. patent application Ser. No. 12/189,078, entitled GENERATING CONTINUOUS QUERY NOTIFICATIONS. That technique involves determining a set of "candidate queries" whenever a row is changed in any table that is referenced in a registered query. The candidate queries are those registered "continuous queries" whose result sets may be affected by the change to the row. Since every change to every row may require a separate candidate query set determination, it is desirable to have a mechanism that can be used efficiently to make such determinations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Continuous Queries (also referred to as Active Queries) is a feature by which applications or end users can "register" interest on certain Queries and receive notifications when the result set of the query changes. Usually these queries represent conditions of interest specific to the application domain (e.g bank balance of a given user falls below 100 OR a new order item is inserted for a given customer). The receipt of the notification would then represent the fact that an event of interest for the application has occurred.

Techniques for implementing continuous queries are described in U.S. patent application Ser. No. 12/189,078. According to those techniques, when an operation affects a row, a determination is made about which continuous queries may have result sets that are affected by the change to the row. The more efficiently such determinations can be made, the greater the overall efficiency of the continuous query feature.

An efficient Filter Index Data structure is described hereafter for efficiently determining a candidate set of queries from a set of registered queries that are likely to be satisfied as a result of a Data Change due to a DML operation, such as an INSERT, UPDATE or DELETE.

Query Registration

As explained in U.S. patent Ser. No. 12/189,078, when Queries of interest are registered with the database, the registration can be performed via a DDL command or some other interface whereby the query of interest is presented to the database. During registration, a queryid is assigned to the query. In addition, the database extracts the predicates from the query and creates a reverse mapping between the predicates and the queryId. The predicates extracted from the query are referred to as Filter Conditions.

Figure 1:
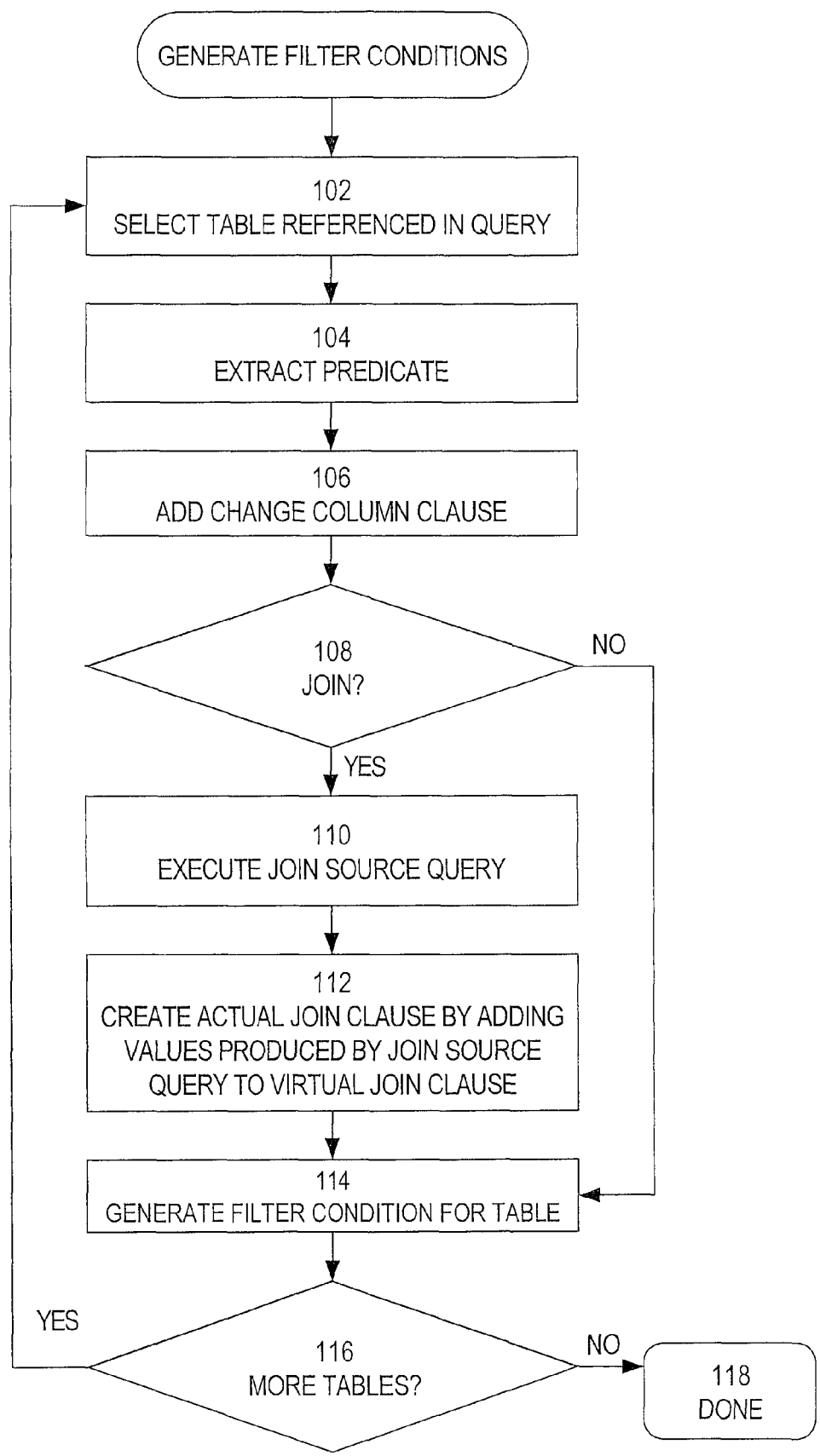
FIG. 1 is a flowchart illustrating general steps for generating filter conditions, according to an embodiment of the invention.

The general steps of generating filter conditions for a query during query registration are illustrated in FIG. 1. For the purpose of explanation, assume that a user desires to register the following query (Q1):
SELECT col1, col2 from T where col3=10 and col4>100

At steps 102 and 116 define a loop that is executed for each table referenced in the query that is being registered. Query Q1 only references one table (T). Therefore, in step 102, table T would be selected. In step 104, the predicate that is related to the selected table is extracted from the query. In query Q1, the relevant predicate is (col3=10 and col4>100). For the purpose of explanation, assume that the database assigned query Q1 the queryId of 1. Under these circumstances, the database server would create a mapping:
(col3=10 and col4>100)→queryId: 1

In order for the query result to change, in addition to the predicate being satisfied, the values of the columns col1 and col2 must change. In order to capture this, in step 106 the database server enhances the filter condition to include this information:
(col3=10 and col4>100) & (CHG_COL(col1) OR CHG_COL(col2) OR CHG_COL(col3) OR CHG_COL(col4)).

In this filter condition, CHG_COL is an abstract function which depends on the kind of DML performed and the nature of the transaction. CHG_COL(col) returns TRUE for those columns that are modified as part of a DML and FALSE for those columns which are not. In the case of an INSERT or DELETE operation, all the columns are implicitly considered to be changed, so CHG_COL(col) will be TRUE for all columns. In the case of an update, CHG_COL would be true only for the columns that were actually updated.

At step 108, the database server determines whether the selected table is involved in any join operations within the query. For query Q1, table T is not involved in any joins, so control proceeds to step 114, where (col3=10 and col4>100) & (CHG_COL(col1) OR CHG_COL(col2) OR CHG_COL(col3) OR CHG_COL(col4)) is saved as the filter condition. At step 116, it is determined that there are no more tables in query Q1 to process, so the filter generation operation is done (step 118).

A registered Query can include JOINS as well. For example, consider the following query Q2 that selects all order line items for Customer Joe since January 2007:
select ol.item_qty, ol.item_name
from orders o, order_lines OL, customers C
where C.name='Joe' and C.customer_id=O.customer_id and
  O.order_date>'January 2007'
and O.order_id=OL.order_id For the purpose of explanation, the customer id of the customer Joe is assumed to be 10. Also, assume that the order numbers 55, 56 and 57 have been placed for customer Joe since January 2007. For example, the initial state of the tables may be as follows:
CUSTOMER: (customer_id=10, 'Joe')
  (customer_id=100, 'John)
ORDERS (customer_id=10, order_id=55, order_date=1-Feb.-2007')
  (customer_id=10,order_id=56,  order_date='2-Feb.-2007')
  (customer_id=10,order_id=57,  order_date='3-Feb.-2007')
  (customer_id=100, order_id=60, order_date='. . . .')
The filter condition on ORDER_LINES is:
  ORDER_LINES.order_id=55 OR ORDER_LINES.order_id=56 OR
  ORDER_LINES.order_id=57)
  AND
    (CHG_COL(order_id) OR CHG_COL (item_qty) OR CHG_COL(item_name). The Filter Condition on ORDER_LINES is derived by instantiating the JOIN predicates.

The initial result of the query Q2 at the time of registration is therefore:
(item_name='IPOD NANO', item_qty=4)
(item_name='DVD PLAYER', item_qty=1)
(item_name 'DIGITAL CAMERA', item_qty=1)

Registration of query Q2 will cause filter conditions to be defined on all the tables involved in the query. Thus, the loop defined by steps 102 and 116 will be executed three times when processing query Q2, once for each of tables CUSTOMER, ORDERS and ORDER_LINES.

When a query involves JOINS, the database server can choose to instantiate the JOIN predicates within the query, provided such predicates are few in number. For example, registration of query Q2 may result in generation of the following filter conditions:

For the Customer table: (Customer.name='Joe' and (CHG_ COL(name) or CHG_COL(customer_id))

For the ORDERS table: (this can involve instantiated Join predicates) (ORDERS.order_date>'January 2007' and ORDERS.customer_id=10) and (CHG_COL(order_date) OR CHG_COL(order_id) OR CHG_COL(customer_id)). The filter on the ORDERS table includes two subclauses ORDERS.order_date>'January 2007' (which is referred to as exclusive clause since it is derived from ORDERS standalone) and ORDERS.customer_id=10 (which is referred to as JOIN clause since it is derived as a result of instantiating the JOIN).

For the ORDER_LINES table: (ORDER_LINES.order_id=55 OR ORDER_LINES.order_id=56 OR ORDER_LINES.order_id=57) AND (CHG_COL(order_id) OR CHG_ COL(item_qty) OR CHG_COL(item_name)). The Filter Condition on ORDER_LINES are derived by instantiating the JOIN predicates.

Creating Join Clauses for Filter Conditions

All tables which are joined with table B and which positionally appear before B in the row source tree in general are potential source tables and would appear in the FROM list of the join source query. The Join Clause construction from a Virtual Join Clause and a Join Source Query will be explained hereafter in a more formal fashion in the section entitled "BUILDING THE TOP CLAUSE".

When rows from a table A are joined with rows from a table B, table A is referred to as the source table for the join. A query that specifies which rows from the source table will be fed into the join operation is referred to herein as the "join source query". When a table in a registered query is involved in a join, the join source query is executed at step 110. For example, for the join between the Customers table and the ORDERS table in query Q2, the JOIN SOURCE QUERY on ORDERS is:
SELECT customer_id from CUSTOMERS where name='Joe'

At step 112, a join clause is created by adding values produced by the join source query to a virtual join clause. A "virtual join clause" is the portion of a query that indicates the join condition(s) between two tables. For example, in query Q2, the virtual join clause on ORDERS is:
ORDERS.customer_id=CUSTOMERS.customer_id.

According to one embodiment, at step 112 the join clause for a filter condition is derived by replacing the source table join column in the virtual join clause with Tuple-values from the join source query. Thus, in the present example, the actual join clause on ORDERS table is derived by substituting Tuple-values from the join source query into the virtual join clause for the CUSTOMERS.customer_id column. In the present example, the substitution yields the clause:
(ORDERS.customer_id=10).

If the join source query returns multiple rows, then the database server creates a disjunction in the join clause of the filter condition. For example, in query Q2, the join source query on ORDER_LINES table is:
SELECT ORDERS.order_id from ORDERS, CUSTOMERS where ORDERS.ucustomer_id=customer.customer_id and customers.name='Joe' and
ORDERS.order_date>'Jan. 1 2007'. Executing this query returns three rows, with order_id values of 55, 56 and 57.

The virtual join clause for the ORDER_LINES table is:
ORDER.order_id=ORDER_LINES.order_id Replacing the join column of the source table with the values returned by the join source query yields the join clause:
ORDER_LINES.order_id=55 OR ORDER_LINES.order_id=56 OR
ORDER_LINES.order_id=57

According to one embodiment, multiple queries (possibly on multiple tables) may be registered with the database as continuous queries. In response to creating the filter conditions for a given query, mapping information is stored to indicate the correlation between filter conditions and queries. For example, in one embodiment, a reverse mapping (Filter Condition->query) is created for each of the registered queries. According to one embodiment, the mapping is used as follows: (a) a set of filter conditions that are satisfied by the row before or after image upon a DML are determined, and then (b) given the set of filter conditions that are satisfied, the mapping is used to compute the set of queries which are potentially affected a result of the DML.

Exclusive and Join Predicates

According to one embodiment, a FILTER-INDEX is created to efficiently determine the registered queries that have filter-conditions that are satisfied by changes made within the database. In one embodiment, an index lookup module takes as input (a) a before image of a row involved in a change, (b) an after image of the row involved in the change, and a DML type (such as INSERT, UPDATE, DELETE). Based on the input, the index lookup module uses the FILTER-INDEX to determine the SET of CANDIDATE queries that are likely to have changed their query result as a result of the current DML.

The general steps involved in building a filter index, according to an embodiment of the invention, include extracting the query predicates for each of the tables referenced in the query. Clauses are then built for each table which is referenced in the query.

As explained above, the clause can include exclusive predicates (i.e those predicates that do not depend on other tables) as well as Join Predicates. Join predicates are derived from Join Caching from the results of Join Source Queries. The composite clause resulting from the Exclusive Clause as well as any Join predicate-derived clauses is called the "filter condition" for that object for that query.

According to one embodiment, a filter index is built based on the predicates extracted during the process illustrated in FIG. 1. The structure of the index may vary from implementation to implementation. Various embodiments of the index shall be described in greater detail hereafter.

Buliding the Top Clause/Extracting the Predicates

The goal of the filter condition for a Table T for a registered query Q is to indicate when a change has a high likelihood of causing a change to the result set of the query Q. Thus, the clause of a query Q should be constructed such that the clause is satisfied by a change (i.e either the before or after images of a row modified as part of the DML change) only when there is a high likelihood that the change affects the result set of the query Q.

According to one embodiment, when the query is parsed, compiled and optimized, a row source tree is generated for the query by the database server. The row source tree describes the access paths that are to be used in the execution of the query (while fetching data). For example, a row source tree may indicate whether the database server should use an index or do a full table scan.

Each node of the row source is also annotated with the predicates that are to be evaluated at each level. Each node of the row source also contains the OUTPUTS that are returned from that node to rowsources above it. The outputs are columns/column expressions returned from this row source or row sources below it. Data flow within a row source tree occurs from bottom to Top and from Left to right.

Where Clause/Row Source Walk

In general, by walking the row source tree in a Depth First Fashion and creating a conjunction of the predicates at each level of the row source tree, the database server should be able to create a clause which is equivalent to the where clause of the original query. In this context, "equivalent" means that the clause may not be identical, but it is guaranteed to be true if and only if the where clause from the original query is TRUE. There may be small textual differences between the clause thus computed and the original where clause due, for example, to the repetition of predicates at multiple levels or any other repetition of identical predicates (e.g. a=10 and a=10).

While traversing the row source tree, the database server identifies any special row sources that yield non-obvious relational relationships among clauses. For example, rowids may be fetched from an index, where the rowids are later converted to bitmaps. Two such rowid bitmaps may then be conjuncted or disjuncted (BITMAP OR/BITMAP AND).

According to one embodiment, when special row sources yield non-obvious relational relationships among clauses, the database server captures the appropriate relationship. For example, assume that the index row sources performed unique key lookups with the predicates (a=10) and (b=20) respectively, and there was a BITMAP OR over the rowids returned by these two row sources. Under these circumstances, the database server would create the composite predicate (a=10 OR b=20) when the database server visits the BITMAP OR node visited during the rowid traversal.

According to one embodiment, during the row source walk, the database server also assigns ordinals (numbers starting with 0) to leaf nodes (Table/Index Row sources) based on the order in which the table is visited during an inorder traversal. Conceptually, predicates flow from tables with lower positions to tables located at higher positions. For example, assume that indexes are defined as follows:
customer_idx on customers(customer_id)
orders_idx on orders(customer_id)
order_lines_idx on order_lines(order_id)

Figure 2:
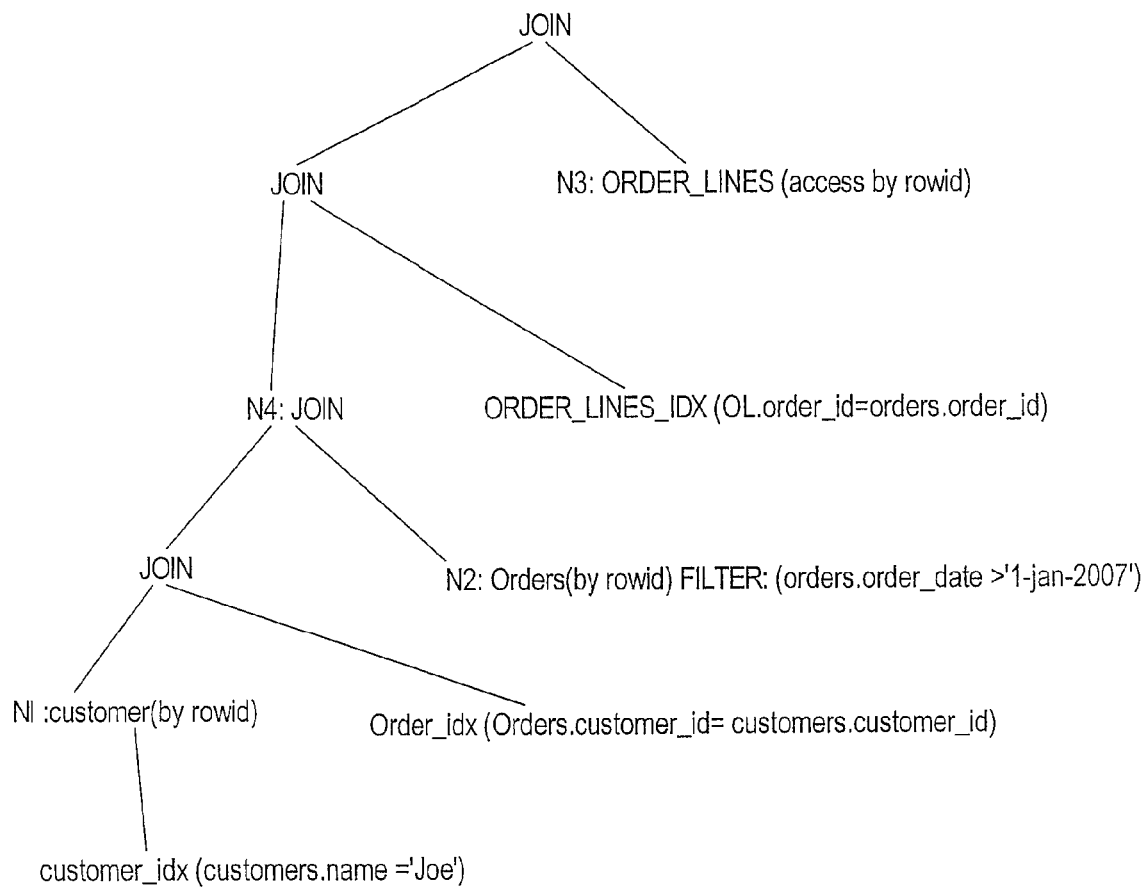
FIG. 2 illustrates a row-source tree for a query, which may be traversed to generate virtual clauses for the query, according to an embodiment of the invention.

Further, the Row Source Tree for query Q2 might be constructed as illustrated in FIG. 2. When walking the rowsource tree illustrated in FIG. 2, ordinals (positions) are assigned as follows: customers 0, orders 1, order_lines 2. The WHERECLAUSE synthesized for the query Q2 would be (customers.name='Joe' AND Orders.customer_id= customers.customer_id AND orders.order_date>'1-Jan.-2007' AND order_lines.order_id=orders.order_id). The output of node N1 is the customer.customer_id column. The output of node N2 is the orders.order_id column. The output of node N3 is Order_line.item_qty, order_line.item_name.

Virtual Clauses

A virtual clause for a table T for a Query Q is a SYMBOLIC representation for the top clause for a (queryId, Table_ name) combination. A virtual clause has the form E AND VJC, where E is the exclusive clause and VJC is the virtual Join Clause. According to one embodiment, a virtual clause is built by recursively traversing the where—clause of the query. When the database server visits a LEAF node (i.e an atomic predicate like a<10), the database server adds the predicate to the emerging virtual clause if the following conditions are true:
(a) The predicate has a reference to columns from T AND
(b) The predicate refers entirely to columns from T (i.e it is an exclusive subclause) OR
(c) The predicate refers entirely to columns from T and columns from other tables U such that the ordinal assigned to U in the row source Tree is smaller than the Ordinal assigned to T.

For example, in the query shown above, the virtual clause on Orders is VC(ORDERS)=(ORDERS.order_date>'1-Jan.-2007' AND orders.customer_id= CUSTOMERS.customer_id). Similarly VC(ORDER_LINES)=(ORDER_LINES. order_id=ORDERS.order_id)

Conceptually, the virtual clause on table T can be split into 2 subclauses: (a) virtual-exclusive-clause(T): the subclause consisting exclusively of references to T, and (b) virtual-join-clause(T): the subclause consisting of joins to tables other than T. In VC(ORDERS) above, the virtual exclusive clause is ORDERs.order_date>'1-Jan.-2007', while the virtual join clause is ORDERS.customer_id=CUSTOMERS.customer_id. As explained above, the Virtual clause of ORDERS can only contain references to CUSTOMER and ORDERS. It cannot contain references to ORDER_LINES because ORDER_LINES has been assigned a higher ordinal than ORDERS.

Join Source Query

The JOIN source query for a Table T for a Query Q is constructed from the WHERECLAUSE of the query. The SELECT LIST of the JOIN source query includes all Column references from the Virtual Clause For T such that the tables referenced in the operands are at positions lower than the position of the given Table. The database server also adds a COUNT (*) to the SELECT LIST to track the reference counts of repeating clauses produced by repeating tuples from the join source query.

ORDERS: Since Customers.customer_id is the only column from the where clause that refers to a table at a lower position compared to ORDERS, customers.customer_id is part of the source query select list.

According to one embodiment, the Source-query-where-clause is constructed by including all base-predicates from the where clause such that the (a) the predicate does not contain any references to the given Table T AND (b) all column references in the predicate are to tables at lower positions. From the where clause of query Q2, For the ORDERS table, the only base predicate from the where clause that satisfies the above criteria is (CUSTOMERS.name='Joe'). Hence, this clause is included in the Join Source Query.

The from-list of the Join Source Query for T includes all the tables in Q at lower positions than the position of T (in the present example, only CUSTOMERS qualifies). The database server also adds a GROUP BY(selop1, selop2, . . . selopn) for each operand that appears in the SELECT LIST. In conjunction with the COUNT(*) in the select list, this enables the database server to track the reference counts of repeating clauses produced by repeating tuples from the join source query. The Join Source Query for ORDERS is therefore: SQ(Orders)—SELECT customers.customer_id, COUNT(*) from CUSTOMERS where CUSTOMERs.name='Joe' GROUP BY (customers.customer_id).

The Join Source Query for ORDER_LINES is SQ(OR-DER_LINES)—SELECT orders.order_id from ORDERS, CUSTOMERS where CUSTOMERS.name='Joe' and ORDERS.customer_id=customers.customer_id GROUP BY (orders.order_id).

Instantiating the Filter_Condition for T

As used herein, exclusive clause(T) refers to a subclause of the where clause that includes references to only columns from T and perhaps other constant operands. The exclusive clause does NOT contain references to any other tables. The Filter_condition for T is the filter clause derived for T from the query Q. The filter_condition for T includes the exclusive predicates on T produced by the query, in conjunction with the instantiated Join Predicates.

In one embodiment, the database server instantiates the Join predicates, by executing the Source Query for T. As tuples are returned from the source query, the database server substitutes the values returned from the source query into the matching column operand from the join part of the virtual clause. For example, the VC(Orders) is Orders.order_date>'1-Jan.-2007' and (orders.customer_id=customers.customer_id).

The join part of the virtual clause V_JC(orders) is (orders.customer_id=customers.customer_id). The source query SQ(orders) is SELECT customers.customer_id, COUNT(*) from CUSTOMERS where CUSTOMERs.name 'Joe' GROUP BY customers.customer_id.

When SQ(orders) is executed, it returns the instantiated values for customers.customer_id columns for the customers Table T. These values are substituted for customers.customer_id in the virtual-join-clause to obtain one or more clauses. In the above example, substituting the values would yield a single clause (orders.customer_id=10).

If there are multiple clauses returned, then the clauses are composed using a disjunction. The resulting instantiated join clause is then conjuncted with the exclusive part of the virtual clause yielding the final clause:
FILTER_CONDITION(ORDERS): (orders.order_date>'1-Jan.-2007' and orders.customer_id=10)

The FILTER_CONDITION on ORDERS as COMPUTED ABOVE contains references entirely to columns from ORDERS and other constant operands. Applying the same procedure to the ORDER_LINES table yields the filter condition:
FILTER_CONDITION(ORDER_LINES): (order lines.order_id=55 OR order_lines.order_id=56 or order_lines.order_id=57). Note the use of a disjunction to handle multiple tuples returned from the Join Source Query on ORDER_LINES.

If the join source query returns too many rows, then the instantiated join_clause will become too large. According to an embodiment of the invention, when the join source query returns more rows than a threshold amount, the database server abandons join caching. When join caching is not used/disabled—then the filter condition for T for query Q is computed to be the exclusive clause for T from the query Q.

Reference Counts

In source query specified above ("SELECT customers.customer_id, COUNT(*) from CUSTOMERS where CUSTOMERs.name='Joe' GROUP BY customers.customer_id"), the group by and COUNT(*) operators are used to generate reference counts for the argument clauses. These reference counts are computed because the same tuple may occur in the join source query more than once. In this case, the clause generated by this tuple will have a reference count denoting the number of times this clause actually occurs.

For example, assume that there are 3 tuples with the same value in the result of the source query. Consequently, the corresponding join clause will have a reference count of (3). If later, the result of the source query were to change such that exactly one of these tuples were to be deleted from the result, then the reference count of the corresponding join clause is decremented by 1. Thus the new reference count for the corresponding join clause would be 2.

If there are no predicates defined on a table within a query Q (e.g SELECT col1 from T), then the database server implicitly defines the filter_condition(Q,T) to be the tautology clause (i.e one that always evaluates to TRUE).

Optimization of Join Source Query Using the Row Source Tree

To track reference counts, the server will still need to do special processing to compute the COUNT(*) and GROUP BY portions of the Join Source Query. This might be achieved, for example, by adding separate GROUP BY row sources on top of nodes N1 and N4, where the added row sources are kept hidden and invisible from the default execution of the query itself.

From examining the row source tree illustrated in FIG. 2, the database server can conclude that the results of SQ(ORDERS) is identical to the outputs of the row source subtree rooted at node N1 (which corresponds to select customer_id from customers where name='Joe'). Hence the database server can bypass the execution of the source query by instead looking at the rows fetched from the row source at this level during the execution of the main query.

Similarly, the database server can determine that the results of SQ(ORDER_LINES) correspond exactly to the outputs generated by the row-source subtree tree rooted at N4 (which corresponds to the query select orders.order_id from customers, orders where customers.name='Joe' and customers.customer_id=orders.order_id and orders.date>'1-Jan.-2007'). Thus, the database server can bypass the execution of the source query and instead the database server can fetch the results of this source query directly by looking at the rows fetched from this subtree during the execution of the main query.

Building the Filter Index

Once filter conditions have been built for all tables T within a query, the database server adds these filter conditions to the Filter Index. Given a DML change (and the row before and after images affected by the change), the filter index returns a candidate set of queryIds that are likely to be affected by the DML change. This candidate set represents all those queries Q such that Filter_condition(Q, T) is TRUE for either the row before image or row after image for the row modified by the current DML operation.

According to one embodiment, the filter index is logically clustered such that all clauses on a given Table (across multiple registered queries) are grouped together. In one embodiment, the filter index includes (FilterCondition, DependentId, reference_count) tuples.

The dependentId can be either a queryId or another FilterConditionId.

As mentioned above, the reference_count tracks the number of times this particular clause contributes to the dependentId. Reference counts are used because of join caching. A given subclause of a join clause has a reference count corresponding to the number of rows within the join source query that generated the clause.

The filter index is the minimal set of filter conditions such that when the DML on table T satisfies the filter conditions fc1, fc2, fc3 . . . , the database server can follow the chain of dependencies starting from fc1 (also fc2, fc3 . . . ) all the way until the database server hits a query. The query is then added to the set of candidate queries that should be considered for Evaluation. In one embodiment, this evaluation is essentially bottom-up, starting with simple relational predicates and moving to more complex clauses and then to queries.

For the filter_condition Qc for a query Q for table T, the database server adds the element (QC, Q, refcount=1) to the FilterIndex(T).

Conjunctive Clauses

The "selectivity" of a clause is an inverse function of the number of tuples for which the clause is TRUE. The higher the number of tuples for which the clause is TRUE, the lower the clause selectivity.

If A AND B AND C is a conjunctive clause and A is chosen as the representative clause, then a dependency is created within the filter condition from A->(A AND B AND C). Logically, this means that if clause A was determined to be true for either the pre-image/post-image corresponding to a DML, then the clause (A and B and C) has to be evaluated further. Moreover, if (A AND B AND C) is a top clause for a table T for query Q, then the following dependency is also created in the filter index (A AND B AND C)-> query Q. This means that if the conjunctive clause A and B and C was determined to be TRUE, then the query Q is considered to a candidate for further evaluation.

The filter_condition itself might be a conjunction of the form A AND B AND C, in which case the database server can choose to add either A, B, or C to the filter index to represent QC. It suffices to add only one amongst the three clauses because all three have to be true for the conjunction to be true.

According to one embodiment, given the information, the database server selects and adds the MOST SELECTIVE amongst the above clauses (if the database server does not know which is the most selective, then the database server can arbitrarily choose).

For the purpose of explanation, assume that clause A is chosen from the conjunction A and B and C. In response to selecting A, the database server generates the entry (T, A, QC), and stores the entry in the filter index. Since the clause A was chosen for the composite filter condition, it is considered to be the REPRESENTATIVE clause for the filter condition.

Selecting a Representative Clause from a Conjunction

According to one embodiment, the database server selects a representative clause from a conjunction based on a variety of factors, which may include:
(a) selectivity: should be high i.e least likely to be TRUE. Adding the most selective subclause ensures that the fewest percentage of DMLs are performing evaluations.
(b) absence of negativity (like a !=b) negative predicates have very low selectivity
(c) complexity of evaluation should be low. For example if a clause involves expression operands like (e1+e2*3) etc, the cost of evaluating the expression is high. Consequently, the run time cost of checking whether or NOT the clause is TRUE becomes very high. Therefore, the database server would prefer to add a clause which is simpler to evaluate (perhaps one that does not involve any expressions).

Disjunctive Filter Conditions

If a filter condition is a disjunction of the form (A OR B OR C), then the database server adds all the three subclauses to the filter index. Adding all the three clauses is necessary because if any of the 3 clauses is TRUE, then the composite disjunction is also true.

According to one embodiment, negation is eliminated upfront by pushing the NOT down the tree where possible. Specifically, in one embodiment, the database server use the rules:
NOT(A and B)=NOT(A) OR NOT(B)
NOT(A OR B)=NOT(A) and NOT(B)
NOT(e1=e2)=e1!=e2
NOT(e1<e2)=e1>=e2 and vice versa.
NOT(e1>e2)=(e1<=e2) and vice versa
NOT(e1 IS NULL)=(e1 IS NOT NULL)
NOT (e1 is NOT NULL)=(e1 is NULL)

Filter Index

According to one embodiment, a FILTER INDEX is a data structure that returns the set of filter_conditions that are true for a given column vector (or row image). The FilterIndex includes the BASE-PREDICATES such that, from the status of the base predicates (i.e whether TRUE or FALSE), the database server should be able to derive the status of the more complex filter_conditions which are TRUE, by bottom-up evaluation for any given DML change.

According to one embodiment, the filter index includes a Fast_Filter for simple predicates. The FastFilter component of the FILTER INDEX uses grouping based on common left-hand-sides (LHS) to minimize evaluations. For each distinct LHS (this can be an expression E), the database server builds a FastFilter (e.g. FastFilter(E)) which contains the following data structures:
(a) Hash Table for equality predicates (e.g E=val)
(b) Has Table for inequality predicates (e.g E!=val)
(c) Balanced Binary search tree 1 for Less-Than and Less-Than-Or-Equal-To predicates
(d) Balanced Binary search tree 2 for Greater-Than and Greater-Than-Or-Equal-To predicates.

Figure 3:
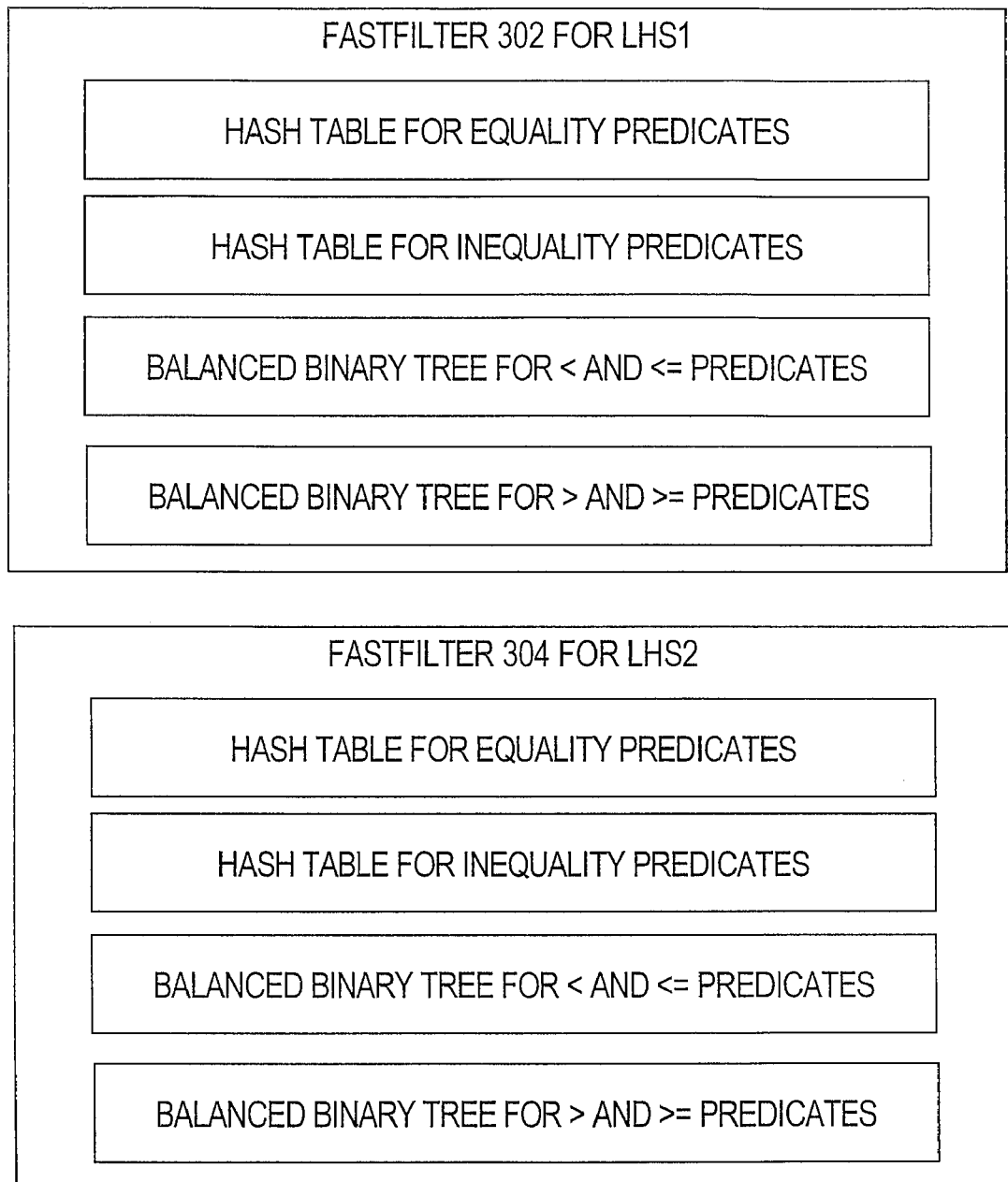
FIG. 3 is a block diagram illustrating two fast filters, according to an embodiment of the invention.

FIG. 3 is a block diagram illustrating two Fast_Filters. Referring to FIG. 3, a first Fast_Filter 302 as been built for predicates that have left-hand-side LHS1 in common. A separate Fast_Filter 304 has been built for predicates that have a different left-hand-side LHS2 in common. Each of the fast filters 302 and 304 include the data structures (a)-(d) described above, to efficiently evaluate their respective predicates.

For the purpose of explanation, assume that there are a set of predicates E=c1, E=c2, E=c3, E=c4 . . . where the LHS (E) is either a column or a more complex expression involving columns col0, col1, col2, col3 . . . from a Table T, and c1, c2, c3 . . . are all constant values. Assume further that the database server builds a data structure FastFilter(E) which contains a Hash Table containing entries for c1, c2, c3 . . . i.e the Right Hand Sides of the predicates shown above. Given an assignment of values to the columns (derived from a row Image), to test which amongst the predicates are satisfied, the database server can evaluate the expression E for the given column vector.

For a more concrete example, assume that LHS 1 is sensor_reading.temperature, and the set of clauses includes:

sensor_reading.temperature=100, sensor_reading.temperature=101 sensor_reading.temperature!=0, sensor_reading.temperature!=1 sensor_reading.temperature<30, sensor_reading.temperature<40 sensor_reading.temperature>110, sensor_reading.temperature>120

Continuing with the concrete example, LHS2 may be (sales.qty*(sales.selling_price-sales.discount)). The corresponding set of clauses may be:

(sales.qty*(sales.selling_price-sales.discount))=1000000,
(sales.qty*(sales.selling_price-sales.discount))=2000000
(sales.qty*(sales.selling_price-sales.discount))>100000
(sales.qty*(sales.selling_price-sales.discount))>200000
(sales.qty*(sales.selling_price-sales.discount))<10000
(sales.qty*(sales.selling_price-sales.discount))<5000

Once the database server evaluates the expression E for a given column vector, the database server can proceed to test each of the predicates explicitly. However, testing each of the predicates explicitly is quite expensive and takes time proportional to the number of predicates present.

Given the hash table (HT), the database server can quickly look up the result in the HT to figure out in O(1) time which of the predicates are likely to be TRUE, thereby significantly improving performance of the operation.

If instead, the set of predicates were of the form E1<c1, E1<c2, E1<c3 . . . where the relational operator is LT, then the database server can build a balanced search tree containing the values c1, c2, c3 . . . A balanced binary search tree can be built either as a RED-BLACK TREE or an AVL-TREE. The database server may maintain a successor/predecessor chain in the AVL tree, which allows the database server to traverse nodes in either ascending or descending order of values.

Given a row image, the database server evaluates the expression E to obtain the result R. When the database server looks up the value R in the AVL Tree, the database server obtains a node $C\_k$ such that $C\_k$ is the lowest value in the Tree greater than or equal to R. ($C\_k$ may not exist, in which case the database server can treat $C\_k$ as an imaginary node beyond the right most leaf). Then, by following the successor chain starting from $C\_k$, the database server can obtain all the predicates which are satisfied for R.

Testing predicates in this manner is more efficient than testing each predicate explicitly. The initial cost (for positioning) is LOG(N) where N is the number of predicates. The rest of the traversal (right scan) is proportional to the number of predicates which are TRUE. (A very similar strategy works for the relational operator<=). In fact, the database server can share the data structure for (<) and (<=) by ordering according to the below:

(E<1) (E<=1) (E<2) (E<=2) (E<3) (E<=3) etc.

Symmetrically, if the relational operator is >(or >=), the database server constructs a Balanced Search Tree containing the right-hand-side (RHS) constant operand values. The ordering is shown below:

(E>=1) (E>1) (E>=2) E>2) (E>=3) (E>3) (E>=4).

The database server position at the node c_k such that C_k is the highest value in the tree which is less than or equal to R. Then, the database server walks the predecessor node starting from the current node to return all clauses which are true.

According to one embodiment, the following transformations may be applied to add a base predicate to the filter index:
(a) Try to transform the predicate such that RHS is a constant.
(b) Add the LHS of the predicate to a linked list. LHS could either be an expression or a simple constant).
(c) Create a HT for equality predicates and an AVL tree for (<, <=) predicates and another AVL tree for (>, >=) predicates.

The above three data structures define the FastFilter for an Expression E.

Explicitly Evaluated Predicates

If a predicate consists of expressions in both the LHS and RHS and cannot be rewritten suitably to make the RHS a constant, the database server then adds the predicate to a data structure dedicated for explicitly evaluated predicates. For example, a predicate like C IS NULL or (C is NOT NULL) can be put in this category. Other predicates like (col1>col2), where col1 and col2 are non-numeric data types, will also need to be explicitly evaluated and there is no good way to put them in the FastFilter. If col1 and col2 were numeric operands, then this can be converted to a fast predicate by rewriting to col1−col2>0.

In the case of in-memory-filters, the filter data structures have to be replicated on the shared memory of all nodes of a cluster database on which DMLs might be performed that are capable of causing the query result to change.

A Persistent Filter Index

A persistent variant of the filter index can be created. A persistent filter index can be useful when the number of filter conditions for a given object is a large number, or if memory available for storing filter conditions is low. According to one embodiment, the persistent filter index uses a BTREE index with key columns:
Filter Index1 (can be an index organized Table)
(Table_id, LHS_col_id/LHS_expression_text, Predicate_operator, RHS_VALUE, dependentId)

Given the above BTREE, computing the true filter conditions for a given DML is largely similar to evaluating the in memory filter. To determine EQUALITY clauses, which are true, the database server looks up the following key for all unique LHS expressions E that exist for the modified table T. (modified_table_id. E, the predicate "=", result of E for the modified row image (before/after)). This gives us the dependent Ids which need further evaluation.

To determine LT (less than) clauses which are true, the database server looks up the following key for all unique LHS expressions E that exist for the modified table T. (modified_table_id, E, the predicate "<", result of E for the modified row image (before/after)). Instead of a simple index lookup, the database server does an index left to right scan using the above as the start-key. Handling GT (greater than) predicates is very similar.

For example, if the clause (T.col1<10) occurs as the filter_condition for query with queryId 3, then the persistent filter index contains the row: (T, col1, <, 10, Q3). The index key columns would be the table_id, LHS_text, predicate_operator, and rhs_value. The dependentId would be the key data.

A separate Btree can be created to hold clauses that will need to be explicitly evaluated. For example, if (SUBSTR (Sales.addr1, 1, 4)=SUBSTR(sales.addr2, 1, 4)) is a predicate on Sales that will need to be explicitly evaluated, then the filter index will contain the following data:
Filter Index2: (Table_id, Clause_text, dependentId)
(Sales, "Sales.purchase_date.Sales.Shipping_date<2, q3)

The clauses for the modified object which are present in filter_index2 will need to be explicitly evaluated.

Computing Queries Affected by a DML Change

According to one embodiment, the database server uses the filter index to efficiently compute the set of queries such that, for every query Q in the set where T is the modified table, Filter_condition(Q, T) is satisfied either for the changed row(s) before Image or the changed row(s) after Image. A row before Image is absent for an INSERT DML and a row after Image is absent for a DELETE DML.

A column vector is defined as a set of (length, value) tuples corresponding to each column in the modified row (either before or after image). According to one embodiment, for each unique LHS expression that appears on the left hand side of a filter condition, the database server computes the value of the expression on the given column vector and looks up this value in the filter Index to compute the set of predicates which are satisfied. A DML change is indicated by of a set of columns modified from a Table T (col0, col1, . . . ) and row before and after images corresponding to that change. In one embodiment, the database server uses bottom-up-evaluation, starting from the base filter conditions that are satisfied by the column vector, and proceeds until the database server reaches a Query.

Figure 4:
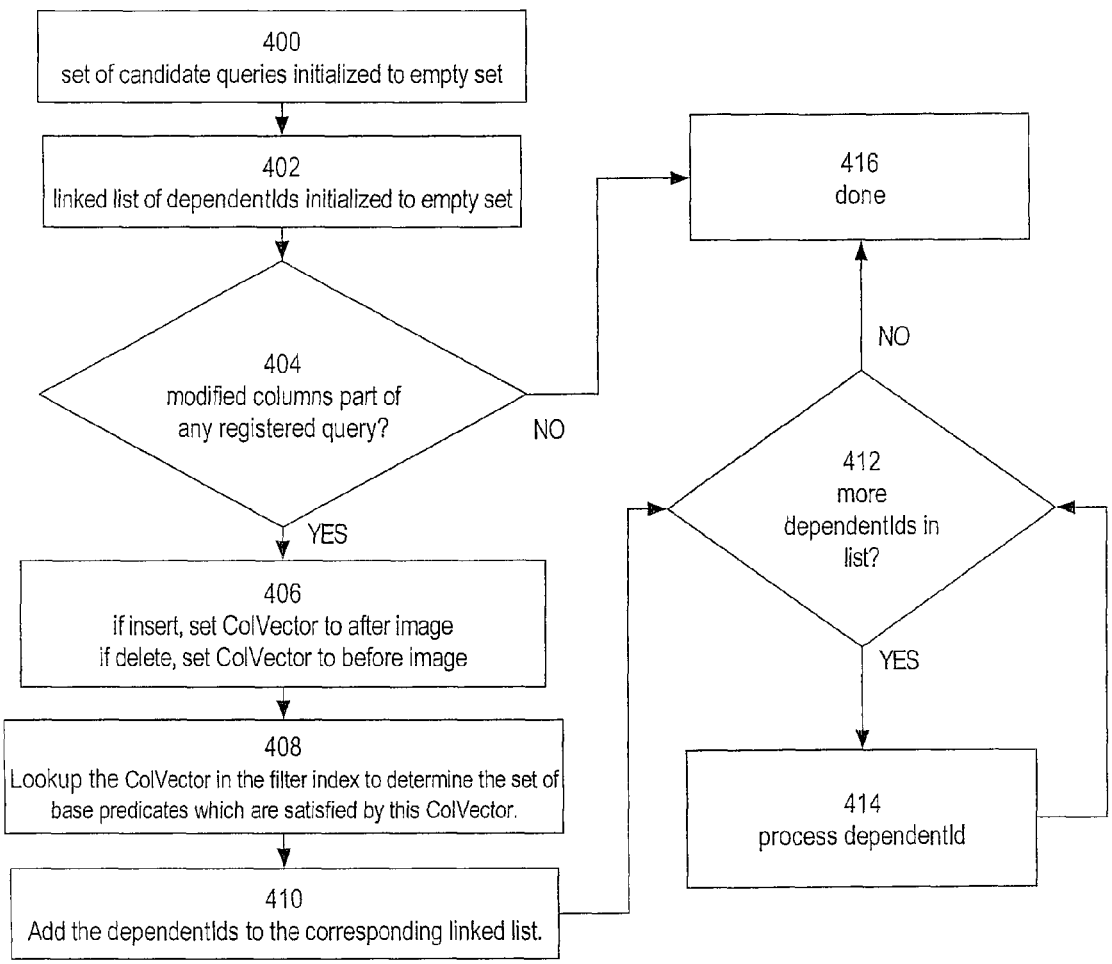
FIG. 4 is a flowchart illustrating us of a filter index to efficiently compute the set of queries whose results sets are likely to have changed by a change to a table, according to an embodiment of the invention.

To begin, the database server initializes the set of candidate queries to the EMPTY SET (step 400 of FIG. 4). The database server then initializes another data structure (linked list of dependentIds) to the EMPTY SET (step 402).

(0) If this is an update and the Modified columns are NOT part of any registered query, then skip (step 404).

(1) If insert or delete, set ColVector to be the row after Image OR row before IMage respectively. If it is an update, repeat steps 2-6 for both the row before Image and the row AfterImage (step 406).

(2) Lookup the ColVector in the filter index to determine the set of base predicates which are satisfied by this ColVector (408). Add the dependentIds to the corresponding linked list (410).

(3) Iterate over the list of dependentIds (414). The specific operations performed to process a dependentId in the list are illustrated in FIG. 5.

Figure 5:
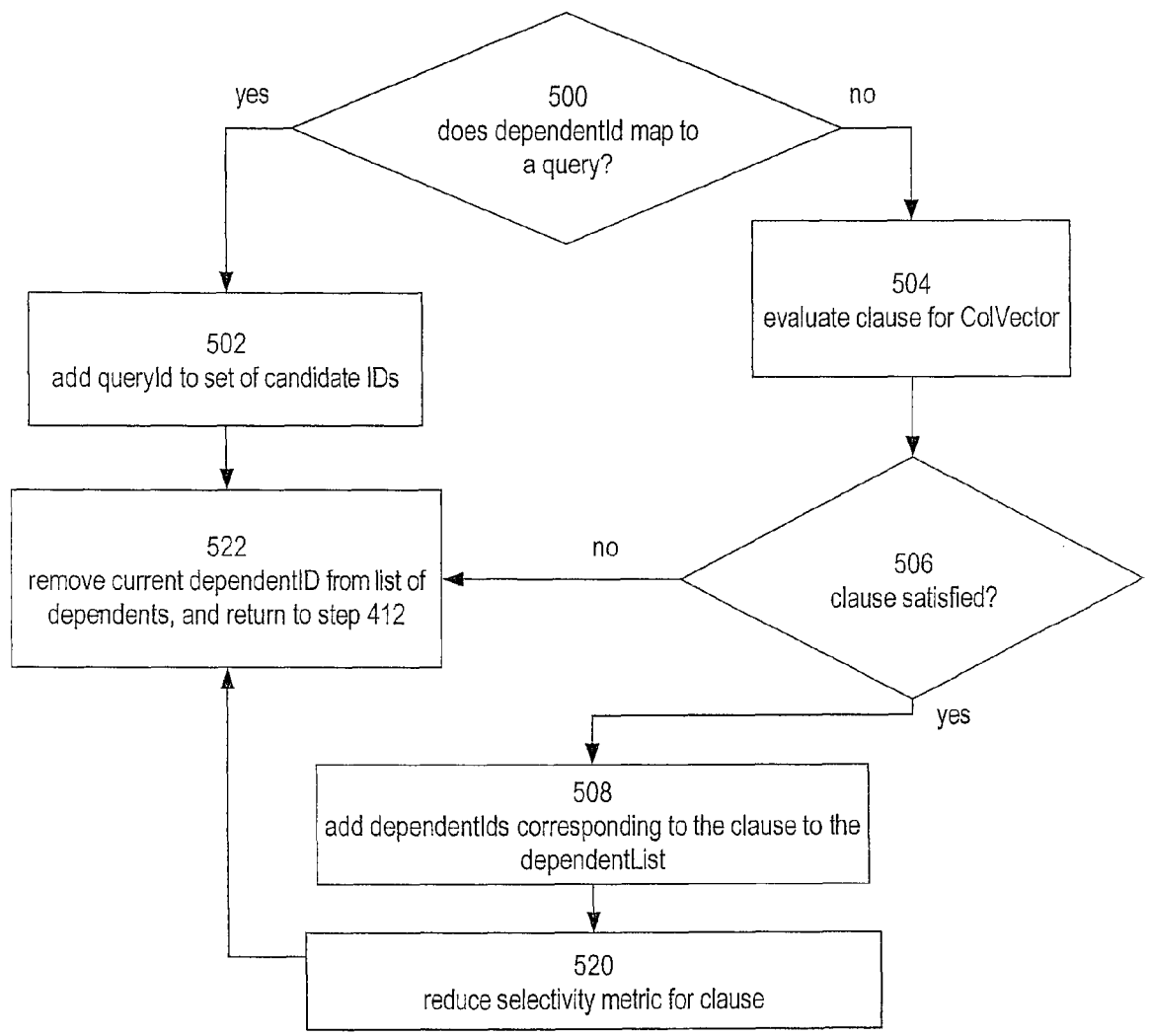
FIG. 5 is a flowchart illustrating step 414 of FIG. 4 in greater detail, according to an embodiment of the invention.
Figure 6:
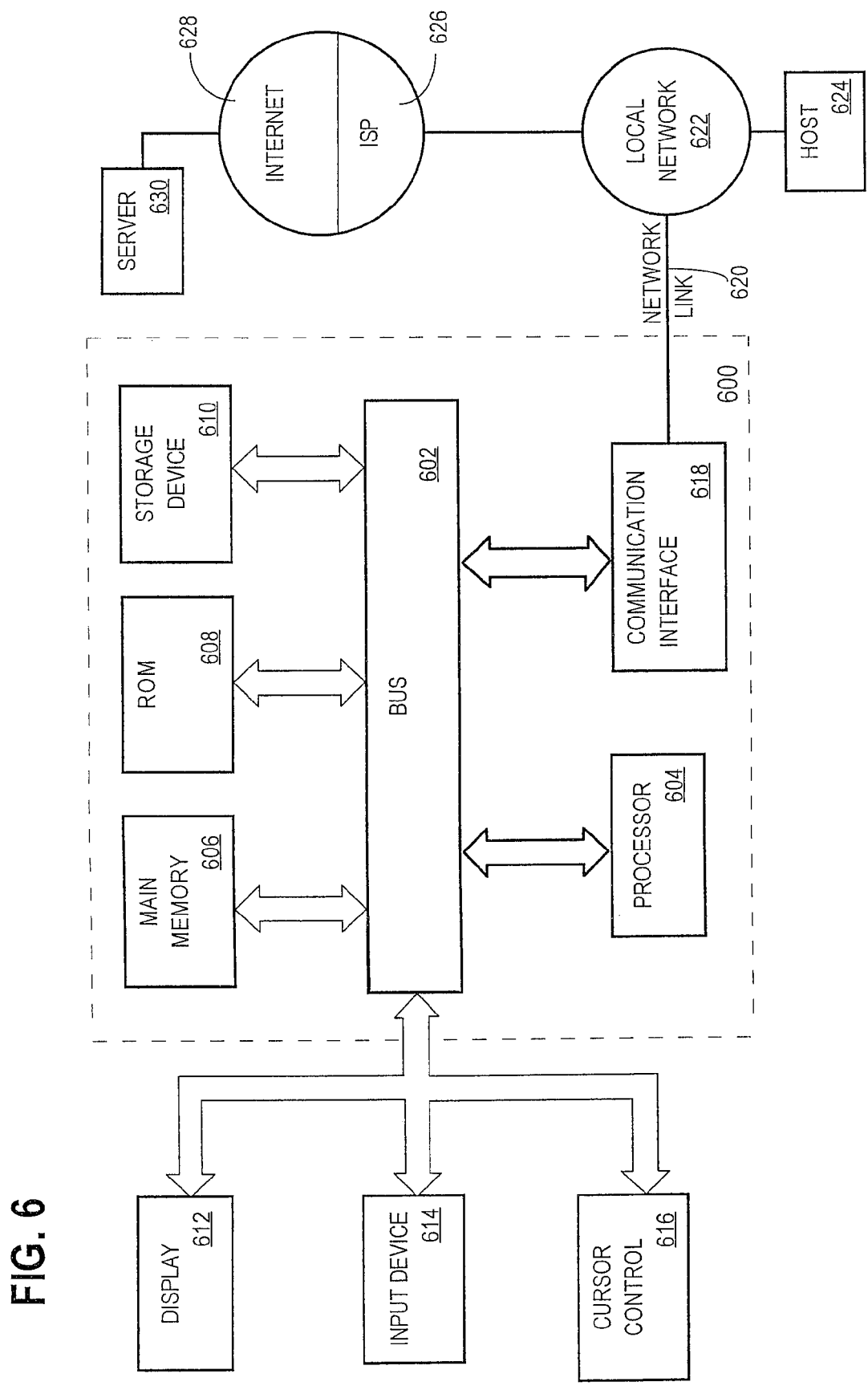
FIG. 6 is a block diagram illustrating a computer system upon which embodiments of the invention may be implemented.

Referring to FIG. 5, if the dependentId maps to a query (500), then the database server adds the queryId to the set of candidate queries (502). After adding the queryId to the set of candidate queries, at step 522 the current dependentID is removed from the list of dependents, and control passes back to step 412.

If the dependentId is a clause, then the database server evaluates the clause for the given ColVector (504). If, at step 506, the clause is not satisfied for the column vector, then at step 522 the current dependentID is removed from the list of dependents, and control passes back to step 412.

If, at step 506, the clause is satisfied for this column vector (506), then the database server adds all dependentIds corresponding to this clause to the END of the dependentList (508). After adding the dependentIDs to the dependentList, at step 522 the current dependentID is removed from the list of dependents, and control passes back to step 412.

In one embodiment, if a clause is satisfied in step 506, then in addition to adding the dependentIDs to the dependentlist, the database server may reduce the SELECTIVITY metric for the clause which is stored in the data structures (520). Maintaining accurate selectivity metrics allows the database server to rebuild the filter index later by choosing more selective representatives for each clause which is part of the filter index.

(4) When the iteration terminates (416), the database server has a stable set of queryIds which represents the set of queries that are likely to be changed as a result of the current DML change. For update statements, the database server has two sets of queryIds, one corresponding to the row before image and another corresponding to the row after Image. For the purpose of explanation, these two sets of queryIds are called Query_set beforeimage and Query_set afterImage, respectively.

Clause Transition for UPDATE statements: The filter_condition for a certain query Q is considered to have transitioned if Q is in the before-image-set but not in the after-image-set or vice versa.

Making the Filterindex Adapt to Changes in Clause Selectivity

According to one embodiment, the database server periodically recomputes the most selective representative clause, and changes the representative clause if the most selective clause has changed. Thus, the database server can make the filter index adaptive in terms of dynamically tracking selectivity of clauses and adjusting it based on the selectivity.

Rules for Pruning the Query Set

Certain cases exist where further pruning can be done on the set of candidate queries. In some of these cases, the database server might be able to remove the query entirely from the candidate set, and in other cases the database server maybe able to conclude that the QUERY IS CHANGED with a high degree of certainty. This is useful towards concluding that the entity that registered the QUERY can be notified without further evaluation.

Shortcut Rules

According to one embodiment, the database server may take a "shortcut" to determine whether a registered query is affected by a change to data within a table. Specifically, the database server applies "shortcut rules" to determine whether certain conditions are satisfied. If the conditions are satisfied, then the database server can determine whether the result set of the query is affected by the change without having to fully evaluate the query.

The outcome of applying the shortcut rules is either NOTIFY, EVALUATE or DISREGARD. NOTIFY means notify registrant that the result set of the query has changes, without further evaluation of the query. EVALUATE means evaluate further to determine outcome. DISREGARD means the result set of the query is unchanged, so the change to the table does not require notification/further evaluation for the query. Various examples of shortcut rules are provided hereafter.

Case 1—Single Table Queries

If a query refers to only a Single Table, and it is determined that the Filter_condition is satisfied for the current DML, then the database server may (a) determine whether the statement is an insert/delete. If the statement is an insert/delete, then the database server may immediately NOTIFY the subscriber(s) that registered the query. This decision is likely to be correct in the vast majority of cases. The only case in which the decision is incorrect is if the DML were later rolled back OR if a compensating change were performed to the table, both unlikely scenarios.

If the statement is an update, then the database server may immediately NOTIFY the subscriber(s) of the registered query if one of the modified columns occurs in the select list OR if the filter_condition is determined to have transitioned.

In either of these cases, the current DML would have changed the query result (unless compensated later by a rollback or a compensating DML).

Case 2—Change to the Top Table of a Multi-Table Join with an Instatntiated Joinpredicate This is a simple extension of case 1 where the query involves a JOIN of more than one table and join caching is used in the query. The database server considers a table to be the Top Table if the table occurs at the highest position in the row source ordering described in the section on the row source traversal. All other tables in the query are at lower positions.

In the case that the query involves a join and join caching is used, the instantiated join predicate on this table will have the complete set of join predicates precomputed, INCLUDING the join predicates. Therefore the database server can use the same rules as Case1 to determine whether or not the query result set changed.

As an example, this rule can be applied to query Q2. When changing order_lines, the database server can immediately conclude whether the query result changed as a result of the current DML because the filter_condition on order_lines is fully defined, thereby eliminating the need to join the new/updated row with the tables orders/customer_table.

Case 3—Using Primarykey-Foreignkey of Uniquekey-Foreign Key Relationship

The database server can provide custom handling for a class of interesting queries where all the JOINS within the query are PrimaryKey-ForeignKey or UniqueKey-ForeignKey. For the purpose of explanation, the abbreviation PK is used for Primary key and FK for foreign Key in the below description.

For the purpose of explanation, assume that a query involving Tables A, B, C where A's PK is joined with B's FK and B's PK is joined with C's FK, has been registered. Assume further that other kinds of joins (i.e those not involving Pk-Uk columns) do not occur in the query.

According to one embodiment, the database server tracks if the query satisfies the following special property: every table that is involved in the PK side of a PK-FK join does not have an exclusive predicate involving the table (though predicates may be present on tables that occur only on the FK side of PK-FK joins).

A scenario where this property is true is for those queries in which a fact table is joined with one or more dimension tables via Foreign keys in the fact table that point to Primary Keys in the dimension tables such that the selective predicates may be on the fact table without any exclusive predicates on the dimension tables. An example of such a query (Q3) is:
SELECT emp.name, dept.name from emp, dept where emp.id=100 and emp.deptid=dept.deptid.

In query Q3, EMP(deptid) is a FK pointing to the PK dept(deptid). The table on the PK side of the join, which is DEPT, does not have any exclusive predicates).

statement Type=Insert/Delte

If the modified table occurs only on the Foreign-Key side of a Fk-PK join (i.e does not occur on the PK side of any FK-PK join within the query), then:

(a) If the query satisfies the special property of (absence of exclusive predicates on all PK tables), then the database server marks the query for notification. The query can be NOTIFIED because, if the inserted (or deleted) row occurs only on the FK side of a FK-PK join, and all the parent tables do not have exclusive predicates, then this newly inserted row is guaranteed to have a corresponding row in the parent tables with which it has a PK join (therefore JOIN condition is automatically satisfied) hence it contributes to the result set. If one of the parent tables has an exclusive predicate, then the database server cannot be sure whether the joining row from the parent satisfies the exclusive predicate. (b) If the query does not satisfy the special property above, then the database server marks the query for evaluation.

If the modified table occurs on the PK side of at least one FK-PK join in the query, then the query is disregarded (no further processing needed for the Top level query, and no notification is published).

If there is at least one Table T2, such that the modified table T is the Unique Key/Primary Key side of a Pk-FK join between T and T2, then this DML cannot change the query result set. The reason is that there cannot be any corresponding row in T2 which joins with this newly inserted row or row being deleted (because FK constraint disallows this). In this case, the database server can safely conclude that the query result is not changed.

Regardless of the outcome determined above, if the query involves the use of JOIN caching and the modified Table contributes JOIN Predicates to upstream tables, (for example, the PK table with which the query joins), then the database server needs to compute the DELTA for the corresponding source query to update the JOIN predicate.

As an example, assume that the registered query (Q4) is:
SELECT emp.name, dept.budget from EMP, DEPT where EMP.location='SFO' and EMP.deptid=DEPT.deptid As mentioned above, in one embodiment, the JoinOrder is based on the positions of the tables in the row source tree (the database server considers the join direction to be from the Table on the Left side of a Join To the table on the right side of the join). In Q4, the join is between EMP.deptid (FK) and DEPT.deptid (PK). Thus, the JoinOrder is EMP→DEPT (join predicates sourced from EMP to DEPT, Source Query on DEPT is select deptid from EMP where EMP.location='SFO')

When a new row is inserted into EMP which satisfies, EMP.location='SFO', the database server can conclude that the insertion changes the query result set, since a JOINING row must exist. However, the database server still needs to update the JOIN predicate on DEPT to include the new value of deptid from the newly inserted row on EMP. The database server needs to modify the predicate on DEPT to reflect the addition of the new department_id because a future update DML to the budget column of the DEPARTMENTS table for this department_id can cause the query result to change. The addition of this new department_id to the predicate is essential for the db server to correctly detect this DML as potentially changing the query result set.

If a new row is inserted into DEPT (which is the PK Table), then a corresponding row in EMP cannot exist so the database server can conclude that the query result is unchanged.

Statement Type=Update (1) If an update involves a column which appears in the select list of the query, then:
  (a) If the modified table occurs on the PK side of a PK-FK join, then the database server marks the query for further evaluation to determine the final outcome. This is because JOINING rows from the FK tables may or may not exist OR they may not satisfy the exclusive predicates defined on those tables so the database server cannot be sure if this changed row contributes to the result set. (This evaluation will also perform any join maintenance that may be required).
  (b) If the modified Table T only appears on the FK side of PK-FK joins which are present in the query, and the query satisfies the special property of absence of exclusive predicates on PK tables, then the database server decides to immediately mark the query for NOTIFICATION. The database server can do so because the database server knows that all JOINS on this table must be automatically satisfied and all exclusive predicates on this table T are guaranteed to be satisfied by virtue of the filter_condition being satisfied. (JOIN maintenance may need to be performed on dependent tables by generating the deltas of the source queries if the query uses the JOIN caching).

(2) If an update involves a column which is part of the Foreign Key column on the FK side of a FK-PK join, and the query satisfies the special property of absence of exclusive predicates on PK tables, then the database server marks the query for NOTIFICATION if there are columns from the PK (parent table) included in the select list. If the foreign key column is changing, then the corresponding row from the PK table that this row joins with will be different compared to the row that it JOINS with in the previous result set—thereby the query result set would have changed. (Here also JOIN maintenance may need to be performed on tables that derive their predicates from this table as a result of joins.

(3) If T occurs only on the FK side of all Pk-FK joins in the query, and if the update causes a transition in the filter_condition(T) i.e the clause is satisfied by the before Image but not by the after Image, and the query satisfies the special property above on absence of exclusive predicates on PK tables, then the database server marks the query for notification.

Since the filter_condition has transitioned, exactly one of the before image, after image tuples can be part of the result set because only one of them satisfied the filter_condition. Furthermore, satisfying the filter condition must imply that the corresponding row image is part of the result set (exclusive clause should be satisfied and all joining rows from PK tables are guaranteed to exist and be part of result set). Hence, the database server can conclude that the query result has changed. (Here also JOIN maintenance may need to be performed on tables that derive their predicates from this table as a result of joins.

In 1(b), (2) and (3) if the query does not satisfy the special property, then the outcome is indeterminate and so the database server has to mark the query for evaluation. Similarly, in one embodiment, in all other cases which do not fall into the rules enumerated above, the query is marked for evaluation.

For example, consider the query Q4 on EMP and DEPT shown above. Assume that the JOIN order is EMP->DEPT. If the database server is updating the NAME column of a row in EMP which satisfies EMP.location='SFO', then since this column is in the select list, the query may change.

This corresponds to the case of the modified column only appearing on the FK side, so the database server decides to NOTIFY.

If the DML were to instead change the budget column of a row in the department table, then the database server does not know for sure that there must be a joining row from EMP. The database server can be sure if and only if the predicates on DEPT were fully instantiated (i.e the JOIN_ORDER was EMP->DEPT) and the database server cached the join predicate on DEPT. In this case, the database server can decide to generate a notification.

If the JOIN order was DEPT->EMP, there is no predicate on DEPT so filter_condition is trivially satisfied for all changes on DEPT. Here, the database server cannot tell if the DML causes a change to result, so the database server marks it for further evaluation.

If the DML were to update the deptid column of DEPT, (i..e the Primary Key column) before such a DML can occur, the database server would have ensured that any rows pointing to this previous value of dept id from EMP would have been deleted. Hence this row cannot be contributing to the result set in its previous state-clearly the new value of dept can also not have any references pointing to it from EMP. Hence the database server can safely conclude that the query result set is unchanged in this scenario.

Maintenance of Join Clauses within the Filter Index as a Result of Transactional Changes Join clause maintenance within the filter index might be necessitated based on the OLTP transactional changes. A join clause for a query for a given Table will need maintenance when the result of the corresponding join_source_query SQ(Q,T) changes as a result of an OLTP transaction.

When join clause maintenance is required, the database server will compute the DELTAs of the source queries. Various techniques by which a database server may compute DELTAs for a source query are set for in detail in U.S. patent application Ser. No. 12/189,078. The DELTAs of the source queries will generate the corresponding DELTAs that will need to be applied to the JOIN CLAUSES to keep them consistent with the transaction commit.

Consider Tables A(i,j,k) and B(i, j,k)

Assume that table A contains the tuples (1, 10, 20) (1, 11, 20), (1, 100, 200) (2, 20, 40)

Assume that table B contains the tuples (1, 10, 11) (2, 20, 40)

For the purpose of explanation assume that the following query (Q5) has been registered:
SELECT * from A, B where A.i=B.i and A.j>9 and B.k=11

Further, assume that the join order is A→B. Under these conditions, the filter_condition(A) will be computed as (A.j>9) and the filter_condition(B) will be computed based on the virtual clause (B.k=11 and B.i=A.i) (B.i=A.i) is the Virtual Join Clause.

The exclusive clause on B is e: B.k=11 The Join Source Query that will instantiate the virtual clause is: SELECT A.i from A where A.j>9.

The initial result of the source query is {(1), (1), (1), (2)} which leads to the argument join clauses c1: (B.i=1, refcount=3) c2: (B.i=2, refcount=1).

The join_clause (which is a disjunction of the argument join_clauses) will be therefore jc1: (B.i=1 OR B.i=2).

The complete filter_condition for B is therefore qcb_b: (B.k=11) AND (B.i=1 OR B.i=2)

The dependency entries created as a result of the above registration would be qcb_b->Query 5->refcount=1
jc1->qc_b refcount=1
c1->jc1 refcount=3
c2->jc1 refcount=1

Assume that a transaction modifies table A with the statement:
delete from A where j<100; commit;

In response to this statement, the rows with the values (1,10,20) and (1, 11,20) are deleted from table A. When the database server computes the DELTA of the source query, the database server will generate the following delta tuple (1, delta_refcount=−2), the delta for the corresponding clause would be (B.i=1, delta_refcount=−2). Since the database server is sourcing join predicates from A->B, the DML on A generates a delta clause which refers to columns from B).

By looking up the data structure of clauses, the database server figures out that B.i=1 corresponds to clause c1. Therefore, the database server must update the reference count contributed by this clause to its parent join clause (jc1) by the value −2. which is the same as decrementing the value by 2.

Therefore, the new dependency entry between c1 and jc1 is changed to c1->j refcount=1.

The join clause will be updated based on all dependency entries which are pointing to it which have a non-zero reference count. This includes both c1 and c2. Therefore the JOIN clause itself remains unchanged for now.

However, assume that a subsequent DML is performed on A, with the statement: Delete from A where i=2. The delta of the source query in this case is the delta tuple (2, −1). By looking up the clause dictionary, the database server figures out that this corresponds to the clause (B.i=2) which is the same as c2.

When the database server updates the refcount for c2->j dependency by the delta value of −1, the database server finds that the final refcount is old_value(1)+delta_value(−1) which is zero. Since the refcount became 0, this clause is no longer part of the Join clause. Hence the join clause is now changed to jc1: (B.i=1)

When the JOIN clause (and hence the filter_condition is updated), the updated clause will need to be propagated to the filter index. According to one embodiment, the updated clause is propagated by deleting the previous filter_condition and inserting the new filter_condition. On a clustered database, the modified filter_condition will need to be propagated to all nodes of the cluster. Thus, the filter is adaptive to the changes in the JOIN predicates triggered by DML transactions.

What is claimed is:

1. A method for identifying registered queries whose result sets were actually changed by a change to data within a table, comprising:
    using a filter index to determine a set of base predicates that are satisfied by the change;
    determining that a particular set of registered queries correspond to the set of base predicates that are satisfied by the change;
    wherein the particular set of registered queries includes at least one registered query whose result set was not actually changed by the change;
    adding, to a set of candidate queries, the particular set of registered queries that correspond to the set of base predicates; and
    using the set of candidate queries to determine which registered queries have result sets that were actually changed by the change to the data within the table;
    wherein using the set of candidate queries includes determining that the result set of the at least one registered query was not actually changed by the change;
    wherein the method is performed by one or more computing devices.

2. The method of claim 1 further comprising,
    adding, to a list of dependent identifiers, dependent identifiers that are associated with the satisfied base predicates;
    before adding dependent identifiers to the list of dependent identifiers, performing the steps of:
        determining whether the change modified columns that were part of any registered query; and
        wherein the step of adding dependent identifiers to the list of dependent identifiers is performed in response to determining that the change modified columns that were part of one or more registered queries.

3. The method of claim 2 wherein the step of adding, to a set of candidate queries, registered queries that correspond to dependent identifiers that have satisfied base predicates includes:
    initializing the set of candidate queries to empty;
    for each dependent identifier in the list of dependent identifiers, performing the steps of determining whether the dependent identifier maps to a registered query;
        if the dependent identifier maps to a registered query, then adding a query identifier of the registered query to the set of candidate queries; and
        if the dependent identifier does not map to a registered query, then (a) evaluating a clause associated with the dependent identifier, and (b) if the clause is satisfied, then adding dependent identifiers corresponding to the clause to the list of independent identifiers.

4. The method of claim 1 further comprising:
    inspecting primary key-foreign key constraints involving the table; and
    based on the primary key-foreign key constraints, removing one or more queries from the set of candidate queries.

5. The method of claim 1 further comprising:
    determining whether a particular query that has been added to the set of queries (a) is a single table query, and (b) is an insert or delete statement; and
    if the particular query is a single table query, and is an insert or delete statement, then sending a notification to a subscriber associated with the particular query without further evaluation of the particular query.

6. The method of claim 1 further comprising:
    determining whether a particular query that has been added to the set of queries (a) is a single table query, and (b) is an update statement; and
    if the particular query is a single table query, and is an update statement, then sending a notification to a subscriber associated with the particular query, without further evaluation of the particular query, when either
        the change modifies data in one or more columns in a select list of the particular query; or
        a filter condition associated with the particular query is determined to have transitioned.

7. The method of claim 1 wherein:
the set of queries includes a particular query that specifies a primary key (PK)-foreign key (FK) join;
the method further comprises:
   determining whether every table that is involved in the PK side of the PK-FK join does not have an exclusive predicate involving the table;
   responsive to determining that every table that is involved in the PK side of the PK-FK join does not have an exclusive predicate involving the table, sending a notification to a subscriber associated with said particular query without fully evaluating the query.

8. The method of claim 1 wherein
the set of queries includes a particular UPDATE query that specifies a primary key (PK)-foreign key (FK) join;
the method further comprises:
   determining whether the table occurs on the PK side of the PK-FK join;
   responsive to determining that the table occurs on the PK side of the PK-FK join, marking the particular UPDATE query for further evaluation.

9. The method of claim 1 wherein
the set of queries includes a particular UPDATE query that specifies a primary key (PK)-foreign key (FK) join;
the method further comprises:
   determining whether the table occurs only on the FK side of the PK-FK join;
   responsive to determining that the table occurs on the FK side of the PK-FK join, determining whether no exclusive predicates are on the PK tables; and
   responsive to determining that no exclusive predicates are on the PK tables, then marking the particular UPDATE query for notification.

10. The method of claim 1 further comprising:
identifying a plurality of clauses disjunctively connected within a query;
selecting a single clause, of the plurality of clauses, as a representative clause for said query; and
within said index, associating the query with only said representative clause.

11. The method of claim 10 further comprising dynamically tracking selectivity of said representative clause.

12. The method of claim 11 further comprising
determining whether selectivity of said representative clause satisfies selectivity criteria; and
responsive to determining that selectivity of said representative clause does not satisfy selectivity criteria, reselecting a different clause, of said plurality of clauses, to be said representative clause for said query.

13. The method of Claim 1, further comprising:
storing a filter condition in the filter index in association with an identifier for a query;
wherein the filter condition is created by performing the steps of:
   receiving the query that includes a join predicate between a first table and a second table,
   generating a virtual clause based on the join predicate;
   generating a join source query based on the WHERE CLAUSE of the query;
   executing the join source query to obtain a set of one or more values from the second table, and
   creating the filter condition based on the virtual clause and the one or more values obtained from the join source query.

14. The method of claim 13 further comprising:
in response to a change made to the first table, performing the steps of:
   reading the filter condition from the index;
   determining whether the change made to the first table satisfies the filter condition; and
   in response to determining that the change satisfies the filter condition, storing data that indicates that said change is likely to have changed a result set of said query.

15. The method of claim 13 further comprising:
generating a reference count for each of the one or more values, wherein the reference count indicates a number of occurrences of each of said one or more values within the result set of said join source query;
computing a DELTA of the join source query;
based on the DELTA, creating a new reference count for a particular value of the one or more values;
in response to the new reference count being zero, revising the filter condition.

16. The method of claim 13 wherein the step of generating a virtual clause includes:
generating an initial virtual clause;
performing a recursive traversal of a where clause of the query;
when a LEAF node is reached during the traversal, adding a predicate associated with the LEAF node to an emerging virtual clause if the predicate satisfies certain conditions.

17. A non-transitory computer-readable medium storing one or more sequences of instructions which, when executed by one or more processors, causes the one or more processors to perform
   using a filter index to determine a set of base predicates that are satisfied by the change;
   determining that a particular set of registered queries correspond to the set of base predicates that are satisfied by the change;
   wherein the particular set of registered queries includes at least one registered query whose result set was not actually changed by the change:,
   adding, to a set of candidate queries, the particular set of registered queries that correspond to the set of base predicates; and
   using the set of candidate queries to determine which registered queries have result sets that were actually changed by the change to the data within the table;
   wherein using the set of candidate queries includes determining that the result set of the at least one registered query was not actually changed by the change.

18. The non-transitory computer-readable medium of claim 17 storing one or more sequences of instructions which, when executed by one or more processors, causes the one or more processors to further perform
   adding, to a list of dependent identifiers, dependent identifiers that are associated with the satisfied base predicates;
   before adding dependent identifiers to the list of dependent identifiers, performing the steps of:
      determining whether the change modified columns that were part of any registered query; and
      wherein the step of adding dependent identifiers to the list of dependent identifiers is performed in response to determining that the change modified columns that were part of one or more registered queries.

19. The non-transitory computer-readable medium of claim 18, wherein the step of adding, to a set of candidate queries, registered queries that correspond to dependent identifiers that have satisfied base predicates includes:

initializing the set of candidate queries to empty;
for each dependent identifier in the list of dependent identifiers, performing the steps of determining whether the dependent identifier maps to a registered query;
if the dependent identifier maps to a registered query, then adding a query identifier of the registered query to the set of candidate queries; and
if the dependent identifier does not map to a registered query, then (a) evaluating a clause associated with the dependent identifier, and (b) if the clause is satisfied, then adding dependent identifiers corresponding to the clause to the list of independent identifiers.

20. The non-transitory computer-readable medium of claim 17 storing one or more sequences of instructions which, when executed by one or more processors, causes the one or more processors to further perform
inspecting primary key-foreign key constraints involving the table; and
based on the primary key-foreign key constraints, removing one or more queries from the set of candidate queries.

21. The non-transitory computer-readable medium of claim 17 storing one or more sequences of instructions which, when executed by one or more processors, causes the one or more processors to further perform
determining whether a particular query that has been added to the set of queries (a) is a single table query, and (b) is an insert or delete statement; and
if the particular query is a single table query, and is an insert or delete statement, then sending a notification to a subscriber associated with the particular query without further evaluation of the particular query.

22. The non-transitory computer-readable medium of claim 17 storing one or more sequences of instructions which, when executed by one or more processors, causes the one or more processors to further perform
determining whether a particular query that has been added to the set of queries (a) is a single table query, and (b) is an update statement; and
if the particular query is a single table query, and is an update statement, then sending a notification to a subscriber associated with the particular query, without further evaluation of the particular query, when either
the change modifies data in one or more columns in a select list of the particular query; or
a filter condition associated with the particular query is determined to have transitioned.

23. The non-transitory computer-readable medium of claim 17, wherein:
the set of queries includes a particular query that specifies a primary key (PK)-foreign key (FK) join;
the non-transitory computer-readable medium storing one or more sequences of instructions which, when executed by one or more processors, causes the one or more processors to further perform:
determining whether every table that is involved in the PK side of the PK-FK join does not have an exclusive predicate involving the table;
responsive to determining that every table that is involved in the PK side of the PK-FK join does not have an exclusive predicate involving the table, sending a notification to a subscriber associated with said particular query without fully evaluating the query.

24. The non-transitory computer-readable medium of claim 17, wherein:
the set of queries includes a particular UPDATE query that specifies a primary key (PK)-foreign key (FK) join;
the non-transitory computer-readable medium storing one or more sequences of instructions which, when executed by one or more processors, causes the one or more processors to further perform:
determining whether the table occurs on the PK side of the PK-FK join;
responsive to determining that the table occurs on the PK side of the PK-FK join, marking the particular UPDATE query for further evaluation.

25. The non-transitory computer-readable storage medium of claim 17 storing one or more sequences of instructions which, when executed by one or more processors, causes the one or more processors to perform the method recited in claim 9. wherein:
the set of queries includes a particular UPDATE query that specifies a primary key (PK)-foreign key (FK) join;
the non-transitory computer-readable medium storing one or more sequences of instructions which, when executed by one or more processors, causes the one or more processors to further perform:
determining whether the table occurs only on the FK side of the PK-FK join;
responsive to determining that the table occurs on the FK side of the PK-FK join, determining whether no exclusive predicates are on the PK tables; and
responsive to determining that no exclusive predicates are on the PK tables, then marking the particular UPDATE query for notification.

26. The non-transitory computer-readable storage medium of claim 17 storing one or more sequences of instructions which, when executed by one or more processors, causes the one or more processors to further perform
identifying a plurality of clauses disjunctively connected within a query;
selecting a single clause, of the plurality of clauses, as a representative clause for said query; and
within said index, associating the query with only said representative clause.

27. The non-transitory computer-readable storage medium of claim 26 storing one or more sequences of instructions which, when executed by one or more processors, causes the one or more processors to further perform
dynamically tracking selectivity of said representative clause.

28. The non-transitory computer-readable storage medium of claim 27 storing one or more sequences of instructions which, when executed by one or more processors, causes the one or more processors to further perform
determining whether selectivity of said representative clause satisfies selectivity criteria; and
responsive to determining that selectivity of said representative clause does not satisfy selectivity criteria, reselecting a different clause, of said plurality of clauses, to be said representative clause for said query.

29. The non-transitory computer-readable medium of claim 17 storing one or more sequences of instructions which, when executed by one or more processors, causes the one or more processors to further perform
storing a filter condition in the filter index in association with an identifier for a query;
wherein the filter condition is created by performing the steps of:
receiving the query that includes a join predicate between a first table and a second table,
generating a virtual clause based on the join predicate;
generating a join source query based on the WHERE CLAUSE of the query;

executing the join source query to obtain a set of one or more values from the second table, and creating the filter condition based on the virtual clause and the one or more values obtained from the join source query.

30. The non-transitory computer-readable medium of claim 29 storing one or more sequences of instructions which, when executed by one or more processors, causes the one or more processors to further perform in response to a change made to the first table, performing the steps of:

reading the filter condition from the index;

determining whether the change made to the first table satisfies the filter condition; and in response to determining that the change satisfies the filter condition, storing data that indicates that said change is likely to have changed a result set of said query.

31. The non-transitory computer-readable medium of claim 29 storing one or more sequences of instructions which, when executed by one or more processors, causes the one or more processors to further perform generating a reference count for each of the one or more values, wherein the reference count indicates a number of occurrences of each of said one or more values within the result set of said join source query;

computing a DELTA of the join source query;

based on the DELTA, creating a new reference count for a particular value of the one or more values;

in response to the new reference count being zero, revising the filter condition.

32. The non-transitory computer-readable medium of claim 29, wherein the step of generating a virtual clause includes:

generating an initial virtual clause;

performing a recursive traversal of a where clause of the query;

when a LEAF node is reached during the traversal, adding a predicate associated with the LEAF node to an emerging virtual clause if the predicate satisfies certain conditions.

* * * * *

UNITED STATES PATENT AND TRADEMARK OFFICE
CERTIFICATE OF CORRECTION

| | | |
|---|---|---|
| PATENT NO. | : 8,185,508 B2 | Page 1 of 2 |
| APPLICATION NO. | : 12/326822 | |
| DATED | : May 22, 2012 | |
| INVENTOR(S) | : Vemuri et al. | |

It is certified that error appears in the above-identified patent and that said Letters Patent is hereby corrected as shown below:

In column 3, line 51, delete "queryid" and insert -- queryId --, therefor.

In column 4, line 31, delete "January 2007" and insert -- Jan-2007 --, therefor.

In column 4, line 33, delete "o," and insert -- O, --, therefor.

In column 4, line 35, delete "January 2007" and insert -- Jan-2007 --, therefor.

In column 4, line 40, delete "January 2007" and insert -- Jan-2007 --, therefor.

In column 5, line 11, delete "January 2007" and insert -- Jan-2007 --, therefor.

In column 5, line 15, delete "January 2007" and insert -- Jan-2007 --, therefor.

In column 6, line 2, delete "ORDERS.ucustomer_id" and insert -- ORDERS.customer_id --, therefor.

In column 6, line 57, delete "Buliding" and insert -- Building --, therefor.

In column 9, line 40-41, delete "name'Joe'" and insert -- name='Joe' --, therefor.

In column 12, line 64, delete "as been" and insert -- has been --, therefor.

In column 13, line 17, delete "LHS 1" and insert -- LHS1 --, therefor.

In column 15, line 49, delete "IMage" and insert -- Image --, therefor.

In column 17, line 26, delete "Instatntiated" and insert -- Instantiated --, therefor.

In column 17, line 39, delete "Casel" and insert -- Case1 --, therefor.

In column 18, line 13, delete "Delte" and insert -- Delete --, therefor.

In column 18, line 52, delete "deptid" and insert -- deptid. --, therefor.

Signed and Sealed this
Twenty-eighth Day of August, 2012

David J. Kappos
*Director of the United States Patent and Trademark Office*

CERTIFICATE OF CORRECTION (continued)
U.S. Pat. No. 8,185,508 B2

In column 18, line 61, delete "SFO')" and insert -- SFO'). --, therefor.

In column 21, line 46, delete "(B.i=1)" and insert -- (B.i=1). --, therefor.

In column 24, line 39, in Claim 17, delete "change:," and insert -- change; --, therefor.

In column 26, line 13-14, in Claim 25, delete "claim 9." and insert -- claim 9, --, therefor.